March 20, 1945. S. P. KINNEY 2,371,760
FILTER
Filed May 22, 1941 4 Sheets-Sheet 1

INVENTOR.
Selwynne P. Kinney
BY
Attys.

March 20, 1945.　　　S. P. KINNEY　　　2,371,760

FILTER

Filed May 22, 1941　　　4 Sheets-Sheet 2

INVENTOR.
Selwynne P. Kinney,
BY
Wilkinson Huxley Byron & Knight
ATTYS

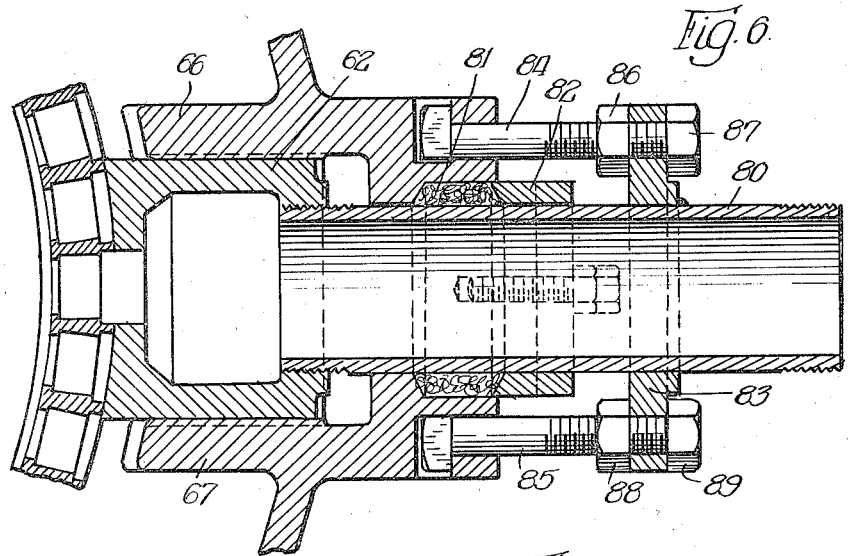
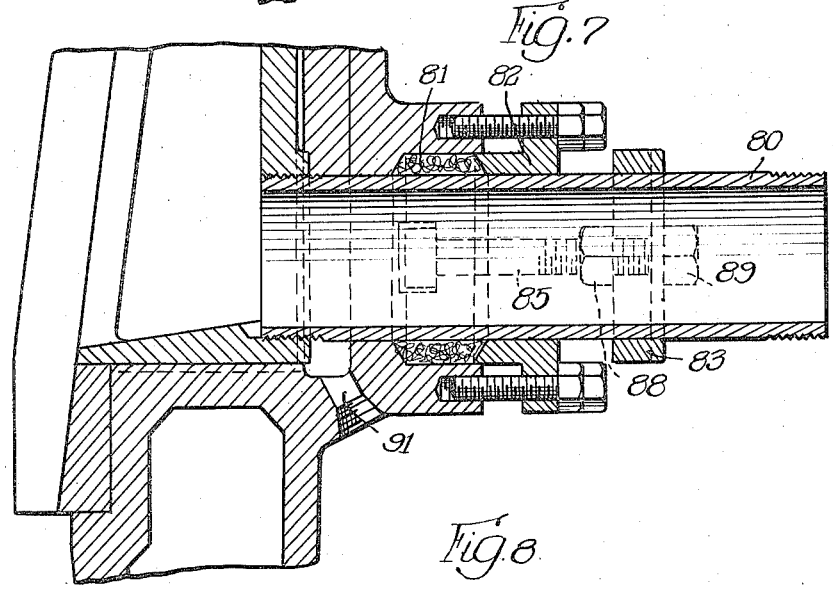
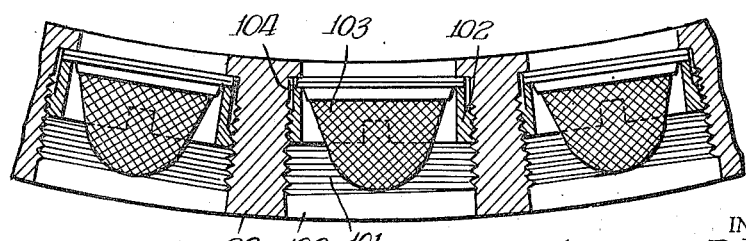

Patented Mar. 20, 1945

2,371,760

UNITED STATES PATENT OFFICE 2,371,760

FILTER

Selwyne P. Kinney, Pittsburgh, Pa., assignor to
H. A. Brassert & Company, New York, N. Y., a
corporation of Illinois Application May 22, 1941, Serial No. 394,667

4 Claims. (Cl. 210—152)

This invention relates to a new and improved filter or strainer and more particularly to apparatus of this type having means for backwashing the filter or strainer elements.

Filters of this type have been constructed having rotatable filter drums, one face of the drum being in communication with the fluid containing the foreign matter to be removed and the other face of the drum communicating with a clean fluid offtake. Means have been provided for passing backwashing fluid in the reverse direction through a portion of the drum filter area as the drum rotates. For efficient operation it is necessary that the backwash header or headers make a close fit against the drum face. It is also necessary that the drum walls make a close fit with bearings which close off any by-passed flow of liquid from the dirty to the clean side of the filter.

Certain present forms of such strainers or filters employ a conical drum which is open at both ends. This drum holds the straining media and is revolved by means of a shaft, said shaft being attached to the drum by spiders at the top and bottom. Ordinarily the housing for the drum and the drum itself are constructed of cast iron. The drum is fitted to the casing, top and bottom, with a close running clearance, so that the water entering the strainer will pass through the straining media and not around the drum. Experience with acid water in the field results in corrosion and erosion, and difficulty is encountered in maintaining a close running fit between the drum and the casing. In order to maintain this fit, sometimes tapered liners have been employed of other metals, such as bronze, thus eliminating wear to some extent by exposing cast iron to bronze. Heretofore the liners have been difficult to change in the field due to design and the number required.

In certain such constructions the water entering the casing tends to exert an upward pressure on the revolving drum before passing through the straining media in the drum. This is due to the fact that the drum is tapered, and that the area of the bottom of the drum is smaller than the area of the top of the drum. The resulting force upward on the drum is a function of the pressure of the incoming water on the outside of the drum and the difference in the area between the top and bottom of the drum. This pressure tends to act upward on the drum and is transmitted to the shaft and results in an upward thrust on the bearings and therefore requires mechanical means for holding the drum down and in its proper place. This upward pressure tends to cause movement, and wear on the cone, at the point of contact between the shaft and the drum. There is also upward pressure exerted on the cover of the strainer or filter if provision is not made for holding the drum down and away from the cover.

In order to overcome the above described pressure on the drum and the results therefrom, my improved construction closes the top of the drum, therefore eliminating the upward thrust. By so doing, the pressure of the incoming water is exerted on the outside of the tapered cone and also on the top of the inverted cone. Since the area of the top of the inverted cone is greater by some 30% than the downwardly projected area of the outer cone, the pressure exerted on the drum will be downward rather than upward with the result that the upward thrust is eliminated and better contact will be maintained between the cone and the bearing at the bottom of the cone.

In prior constructions the cone makes contact with the casing at two places, that is, the top and bottom. These contacts are close running fits and are difficult to maintain under operating conditions. Difficulties encountered, as mentioned above, are wear, erosion and corrosion. By closing the top of the cone, one of these running fits is eliminated, and I provide at the top of the cone a baffle rather than a running fit. A running fit is not now necessary, and the baffle is provided for the purpose of forming a means of retarding the passage of any gravel, rocks or large particles of foreign matter which may be in the incoming liquid. This baffle at the top of the cone will prevent these materials from getting up into the upper part of the strainer or filter at the top of the cone.

In the operation of the revolving strainer a portion of the clean water, amounting to less than five percent (5%), is reversed in direction and passes from the inside to the outside of the drum through a backwash opening. By reversal of flow of a small amount of clean water, it is possible to continuously clean the straining media. The same conditions of wear exist at the backwash as in the liners at the top and bottom of the drum, and to eliminate this wear my improved construction provides a bronze box which is employed as a backwash connection. This bronze unit sets on top of the bronze ring at the base of the cone and on a portion of the strainer body. The box is closed on five sides and is arranged so that it may be adjusted in close proximity to the revolving cone.

It is an object of the present invention to provide a new and improved backwashing filter in which the relationship between fluid sealing surfaces is readily adjustable and in which members carrying such surfaces may be readily removed for adjustment or refinishing and in which such members may be easily replaced.

It is a further object to provide a construction of this character in which the bearings for the rotating filter drum are located exteriorly of the apparatus and out of contact with the fluid being cleaned.

It is an additional object to provide a construction which is simple in design and adapted for commercial production and use.

Other and further objects will appear as the description proceeds.

I have shown a preferred embodiment of my invention in the accompanying drawings, in which—

Figure 6 is a fragmentary transverse section through the lower portion of the backwash box;

Figure 7 is a vertical section through the construction of Figure 6; and

Figure 8 is a fragmentary horizontal section through the filter drum.

Figure 1:
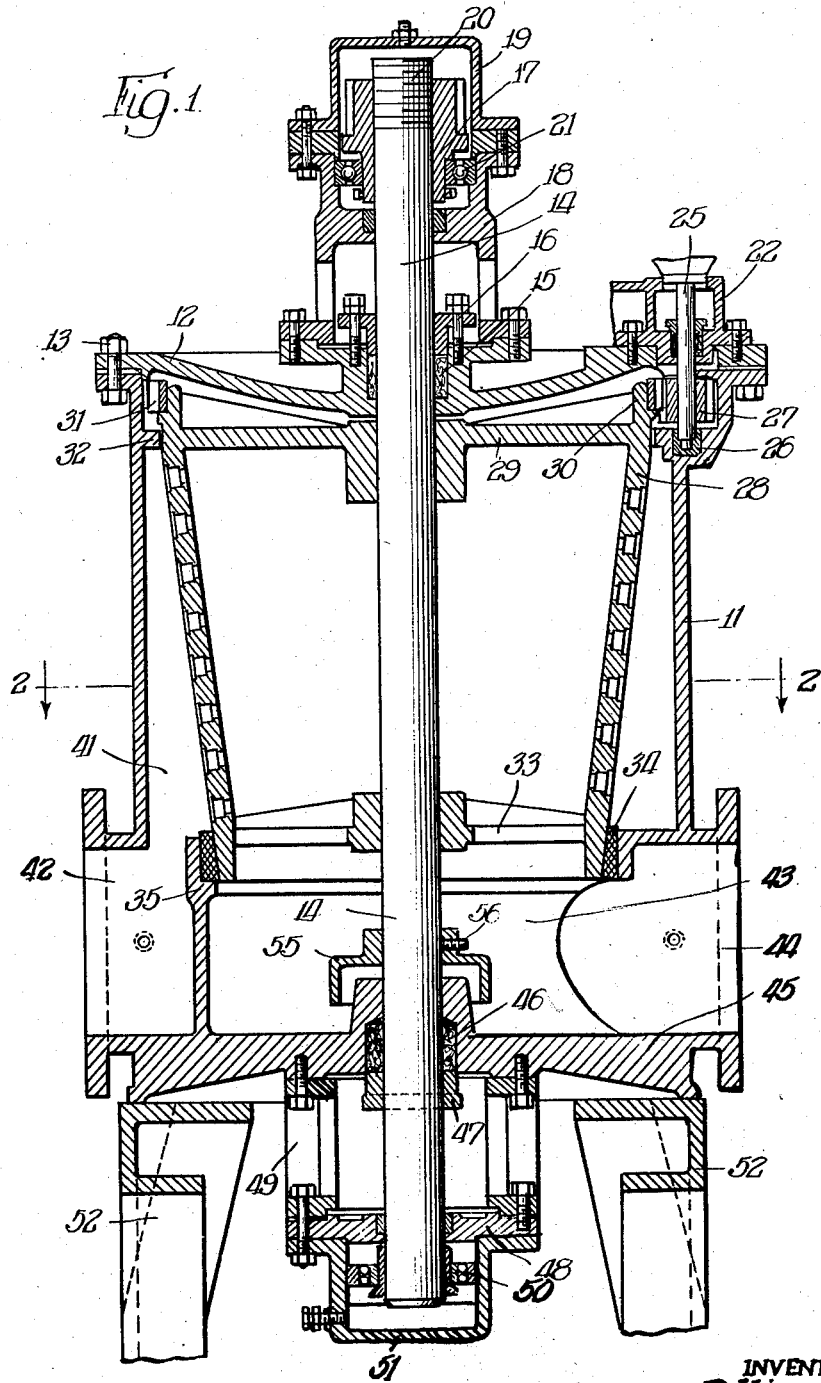
Figure 1 is a vertical section through the filter or strainer.
Figure 2:
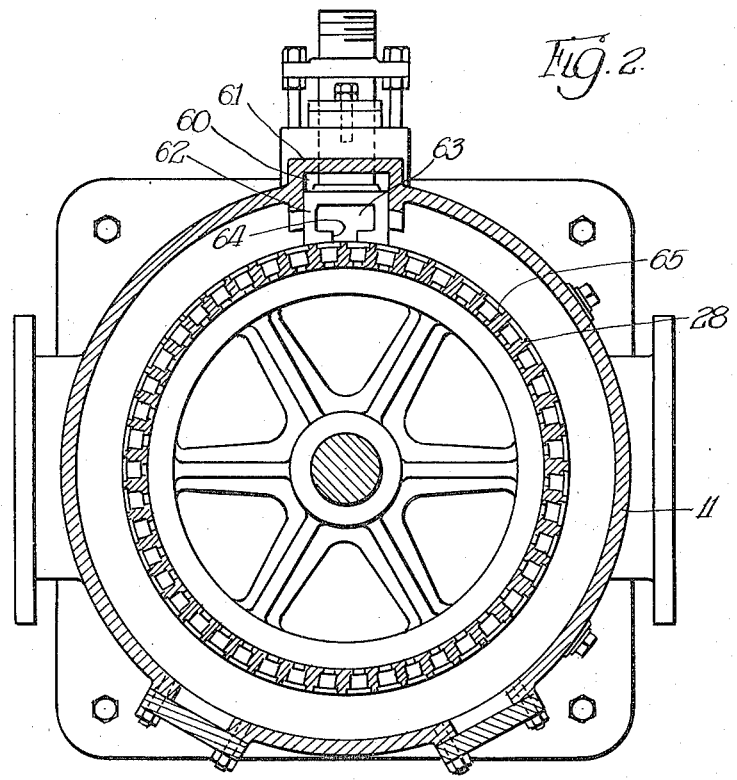
Figure 2 is a horizontal section taken on line 2—2 of Figure 1.
Figure 3:
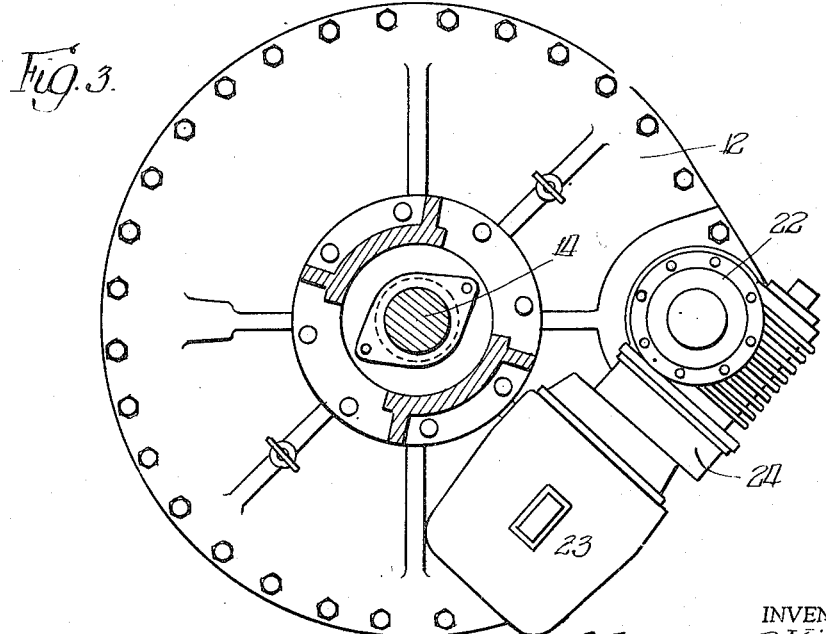
Figure 3 is a plan view of the strainer, the upper bearing being removed to show the construction more clearly.

The filter or strainer comprises the housing 11, having the removable cover 12 fitted upon the housing and held in place by bolts 13. This cover 12 is provided with a central opening for the filter drum shaft 14 about which the cover carries the packing 15 held in place by gland 16. The upper bearing 17 for shaft 14 is carried upon the support member 18 and closed by the cover member 19. The bearing 17 is adjustable on the threaded portion 20 of shaft 14 and engages the ballbearing assembly 21 mounted in the member 18. The cover 12 also supports the drive housing 22 which carries the drive motor 23 shown in Figure 3, which through a reduction gear 24 drives the vertical shaft 25. This shaft 25 has its lower end fitting in a bearing 26 in the housing 11, and the shaft carries the drive gear 27. The shaft 14 supports the filter drum 28 within the housing 11, this drum having a closed upper face 29. The rim 30 projects above the face 29 around the periphery of the drum and carries the toothed drive ring 31 which meshes with drive gear 27.

The housing 11 is provided with the inwardly extending baffle ring 32 which extends adjacent the upper periphery of the drum 28 to prevent large particles of foreign matter passing to the upper face of the drum and to the region of the drive gears. The outer wall of the drum 28 is frusto-conical in form and its lower portion is supported from shaft 14 by means of the spider 33. This lower portion of the drum engages the bronze bearing ring 34 which has a cylindrical outer face and flat lower face seating in the division wall 35 in the housing. The inner face of the bronze bearing 34 is frusto-conical in shape to engage the outer face of the drum 28. The division wall 35 separates the intake chamber 41 and intake opening 42 from the interior of the drum 28, the outlet chamber 43 and outlet opening 44.

The shaft 14 passes downwardly through the base 45 of the housing, being surrounded by packing 46 held in place by adjustable gland 47. The lower bearing assembly 48 is carried from the base 45 by bracket 49, this assembly including the ball race 50 and housing 51. The housing 11 is shown as supported by means of the legs 52. Within the housing the shaft 14 carries the protective flange 55 secured thereto by set screw 56. This flange tends to prevent fluid and any remaining fine foreign matter from entering the lower bearing of the shaft in the housing bottom.

Figure 4:
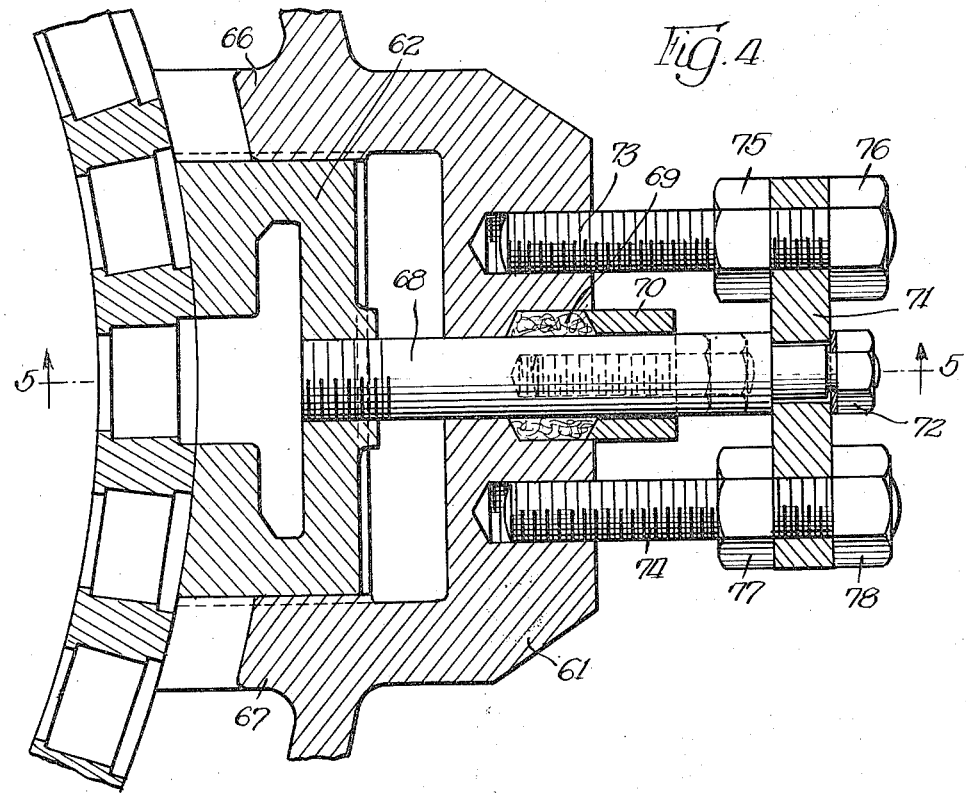
Figure 4 is a fragmentary horizontal section on an enlarged scale, taken on line 4—4 of Figure 5, and showing the upper adjustable connection to the backwash box.
Figure 5:
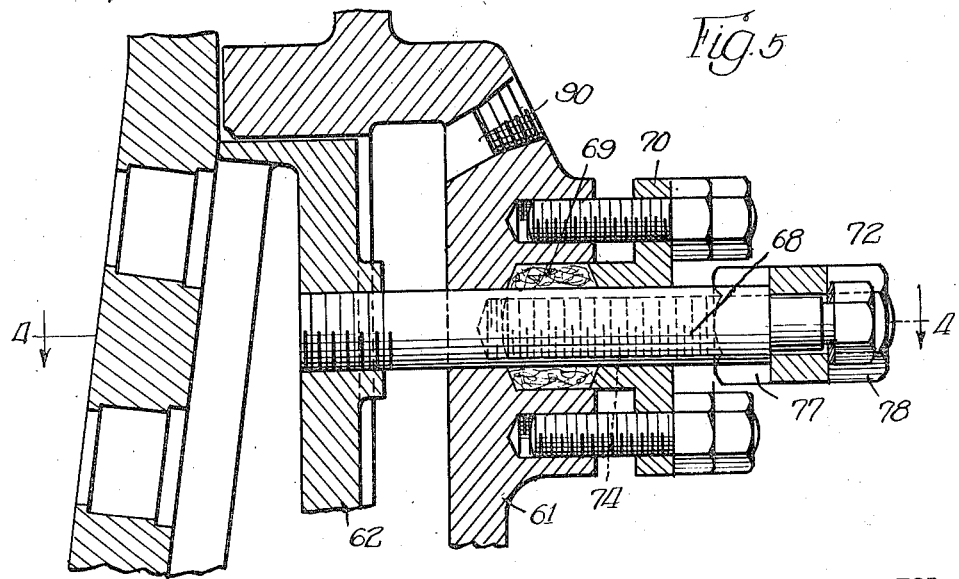
Figure 5 is a fragmentary vertical section taken on line 5—5 of Figure 4.

The backwash assembly is shown in Figures 2 and 4 to 7, inclusive. The housing 11 is provided with the recess 60 formed by the offset portion 61 which receives the backwash box or header 62, which has a sliding fit in the recess. Said offset portion 61 extends around the header 62, said header being disposed in the chamber provided by said offset portion. The box or header 62 has an interior passage 63 extending its full length and communicating with a slot or opening 64 equal in width to the width of the openings 65 in the drum 28. As shown in Figure 6, the offset portion 61 includes the two vertical side walls or fins 66 and 67. As shown in Figures 4 and 5, the upper portion of the header 62 is provided with the adjusting rod 68 which passes outwardly through the portion 61 of the housing 11, through packing 69 and gland 70. The outer end of this adjusting rod is secured to a cross member 71, by means of nut 72. This cross member 71 has openings receiving the adjusting screws 73 and 74, the screw 73 being provided with nuts 75 and 76 upon opposite sides of member 71, and screw 74 being similarly provided with nuts 77 and 78.

As shown in Figures 6 and 7, the lower end of the header 62 is provided with the backwash discharge pipe 80 which passes through packing 81 compressed by gland 82. The pipe 80 is provided with a cross member 83 which is shown as welded thereto, this member having openings through which pass the adjusting screws 84 and 85. The screw 84 is provided with adjusting and locking nuts 86 and 87 on opposite sides of member 83, and screw 85 is similarly provided with nuts 88 and 89. The recess or channel 60 receiving the back wash header 62 is provided with a clean-out and drainage opening 90 at its upper end, as shown in Figure 5, and a similar opening 91 at its lower end, as shown in Figure 7.

The drum 28, as best shown in Figure 8, is provided with a plurality of openings 100, which are circular in cross-section and internally threaded as shown at 101, to receive clamping rings 102 which retain the filter members 103 in place against the inner shoulders 104. The filter members are shown in the shape of a rounded cone with the apex directed outwardly of the drum.

In use of the apparatus, the drum 28 is slowly revolved by the power transmitted from motor 23 through reduction gear 24 to the drive shaft 25 and through gear 27 and gear ring 31 to the drum. During this rotation, the drum is fully supported by the upper and lower bearings which are spaced from the housing and not subject to contact by the fluid being cleaned. The incoming water or other fluid containing the matter to be filtered or strained therefrom, enters the housing through opening 42 and passes up into the chamber 41 around the drum 28. This fluid will also fill the chamber above the upper face 29 of the drum, passing between baffle 32 and the drum. The close clearance at this point, however, prevents any large foreign matter getting up among the gears. The upper face will be under fluid pressure and this pressure will exceed the upward component of the pressure against the frusto-conical face of the drum, so that the resultant effect of the fluid pressure will be to hold the drum down in contact with the bronze bearing member 34 at the lower end of the drum. This minimizes any danger of leakage past this bearing. It also has the effect of making the drum run more smoothly.

The backwash header 62 is inserted after the insertion of the bronze bearing 34, both being inserted from the top of the housing before the drum 28 is installed. After the header is put in place, the adjusting rod 68 and outlet pipe 80 are threaded into the header and after installation the clearance between the header and the drum may be accurately adjusted by manipulation of the nuts carried by the upper and lower adjusting screws 73 and 74 and 84 and 85. It will be noted that two parallel fins 66 and 67 extend inwardly to provide lateral support for the header 62 during the operation of the strainer or filter.

This construction avoids the necessity of having any large opening through the filter housing for installing the backwash box or header. The glands about the rod 68 and the pipe 80 may be easily adjusted to provide fluid-tight joints at this point. The construction shown provides for the elimination of any running fit at the top of the strainer cone, and the liner or bearing 34 at the bottom is arranged so that it may be readily removed and replaced in case of wear. The backwash header or box is also readily adjustable in and out and may be replaced or changed in case of excessive wear. The design is such that the water pressure effectively aids in maintaining the running fit against the lower bearing cone and also has the effect of making the unit run more steadily due to the downward thrust. The bearings are placed entirely out of the housing and consequently all danger is avoided of foreign matter from the fluid entering the bearings.

While I have shown a preferred embodiment of my invention, it is to be understood to be illustrative only, as I contemplate such changes and modifications as come within the spirit and scope of the appended claims.

What is claimed is:

1. In a filter of the backwashing type, a housing, a rotatable filter drum located in said housing, a division wall in said housing, said division wall having an opening therein, one end of said drum having fluid-tight bearing relationship with the periphery of said opening, said division wall and said drum dividing said housing into a fluid receiving chamber and a fluid discharge chamber, said receiving chamber having a fluid inlet, said discharge chamber having a fluid outlet, said housing having an offset portion in its periphery, said offset portion extending longitudinally of said housing, a backwash receiving header disposed within said offset portion, said header having an opening communicating with said filter drum, said offset portion extending around said header, and adjusting means secured to said header and extending through said offset portion to the exterior thereof, said header having a discharge aperture, said adjusting means being disposed in position to provide adjustment of said header radially of said drum.

2. In a filter of the backwashing type, a housing, a rotatable filter drum located in said housing, a division wall in said housing, said division wall having an opening therein, one end of said drum having fluid-tight bearing relationship with the periphery of said opening, said division wall and said drum dividing said housing into a fluid receiving chamber and a fluid discharge chamber, said receiving chamber having a fluid inlet, said discharge chamber having a fluid outlet, said housing having an offset portion in its periphery, said offset portion extending longitudinally of said housing, a backwash receiving header disposed within said offset portion, said header having an opening communicating with said filter drum, said offset portion extending around said header, adjusting means removably secured to said header, and a fluid discharge conduit removably secured to said header and communicating with the interior thereof, said adjusting means being disposed in position to provide adjustment of said header radially of said drum, said offset portion being provided with apertures for receiving said adjusting means and said conduit whereby said adjusting means and said conduit may be inserted in said header through said housing after said header has been located in said offset portion interiorly of said housing.

3. In a filter of the backwashing type, a housing, means dividing said housing into a fluid receiving and a fluid discharge chamber, said dividing means including a division wall having an opening and a filter drum rotatably carried by said housing to rotate about a vertical axis, one end of said drum having fluid-tight bearing engagement with the periphery of said opening, an inlet to said fluid receiving chamber, an outlet for said fluid discharge chamber, said drum having a frusto-conical wall, an open lower end and a larger imperforate upper end, a shaft upon which said drum is mounted, bearings for said shaft located exteriorly of said housing, packing means for preventing access of liquid from said housing to said bearings, and a frusto-conical bearing for the lower portion of said frusto-conical wall, said imperforate upper end having an effective area greater than the downwardly projected effective area of said frusto-conical wall, the upper imperforate wall of said drum having communication with said fluid receiving chamber.

4. In a filter of the backwashing type, a housing, means dividing said housing into a fluid receiving and a fluid discharge chamber, said dividing means including a division wall having an opening and a filter drum rotatably carried by said housing to rotate about a vertical axis, one end of said drum having fluid-tight bearing engagement with the periphery of said opening, an inlet to said fluid receiving chamber, an outlet for said fluid discharge chamber, said drum having a frusto-conical wall, an open lower end and a larger imperforate upper end, a shaft upon which said drum is mounted, bearings for said shaft located exteriorly of said housing, packing means for preventing access of liquid from said housing to said bearings, and a frusto-conical bearing for the lower portion of said frusto-conical wall, said imperforate upper end having an effective area greater than the downwardly projected effective area of said frusto-conical wall, the upper imperforate wall of said drum having communication with said fluid receiving chamber, the upper portion of said drum and said housing being provided with baffle means for preventing access of large particles of material to the portion of said housing above said drum.

SELWYNE P. KINNEY.